United States Patent [19]

Sahashi et al.

[11] Patent Number: 4,578,125

[45] Date of Patent: Mar. 25, 1986

[54] PERMANENT MAGNET

[75] Inventors: Masashi Sahashi, Fujisawa; Koichiro Inomata; Naoyuki Sori, both of Yokohama; Hideki Yamamiya, Yamato, all of Japan

[73] Assignee: Tokyo Shibaura Denki Kabushiki Kaisha, Kawasaki, Japan

[21] Appl. No.: 392,593

[22] Filed: Jun. 28, 1982

[30] Foreign Application Priority Data

| | | | |
|---|---|---|---|
| Jul. 3, 1981 | [JP] | Japan | 56-103434 |
| Oct. 2, 1981 | [JP] | Japan | 56-156203 |

[51] Int. Cl.[4] .......... C04B 35/00

[52] U.S. Cl. .......... 148/31.57; 148/101; 148/104; 420/435; 420/582

[58] Field of Search .......... 148/31.57, 435, 442, 148/101, 102, 104; 420/435, 582

[56] References Cited

U.S. PATENT DOCUMENTS

| | | | |
|---|---|---|---|
| 4,211,585 | 7/1980 | Inomata et al. | 148/31.57 |
| 4,284,440 | 8/1981 | Tokunaga et al. | 148/31.57 |
| 4,289,549 | 9/1981 | Kasai | 148/101 |

FOREIGN PATENT DOCUMENTS

| | | | |
|---|---|---|---|
| 2727243 | 12/1977 | Fed. Rep. of Germany . | |
| 2814570 | 10/1979 | Fed. Rep. of Germany . | |
| 2944031 | 6/1980 | Fed. Rep. of Germany . | |
| 52-109191 | 9/1977 | Japan . | |
| 54-98998 | 8/1979 | Japan | 148/31.57 |
| 55-15096 | 4/1980 | Japan . | |
| 56-156735 | 12/1981 | Japan | 148/31.57 |
| 57-100705 | 6/1982 | Japan | 148/31.57 |
| 2089371 | 6/1982 | United Kingdom | 148/31.57 |

*Primary Examiner*—John P. Sheehan
*Attorney, Agent, or Firm*—Schwartz, Jeffery, Schwaab, Mack, Blumenthal & Evans

[57] ABSTRACT

Disclosed is a comprising a powdered alloy composed of 23 to about 29% by weight of samarium, 0.2 to about 7% by weight of titanium, 3 to about 9% by weight of copper, 10 to about 25% by weight of iron, and the balance of cobalt principally; said powdered alloy being sintered to obtain a sintered body, followed by (a) annealing the sintered body at a cooling rate of not more than 5° C./min from an annealing-initiating temperature of from 600° to 900° C., or (b) subjecting the sintered body to a multi-stepwise aging processing initiated from a higher temperature to a lower temperature within the temperature range of from 350° to 900° C.

The magnet is excellent in all the magnetic properties such as residual magnetic flux density, coercive force and maximum energy product, and also excellent in antioxidation property.

4 Claims, 5 Drawing Figures

PERMANENT MAGNET

BACKGROUND OF THE INVENTION

This invention relates to a permanent magnet of a samarium(Sm)-cobalt(Co) system, particularly to a permanent magnet of $Sm_2Co_{17}$ system. More particularly, it relates to a permanent magnet having excellent magnetic properties such as residual magnetic flux density (Br), coercive force ($_I$Hc) and maximum energy product ((BH)max), and also excellent oxidation resistance.

As a permanent magnet of R—M system (wherein R is a rare earth element such as Sm, Ce or Y; and M is Co or such a metallic element as Cu, Fe, etc. to be used in combination with Co), there has been proposed a variety of permanent magnets having various composition. For these permanent magnets, maximum energy product ((BH)max) and residual magnetic flux density (Br) are particularly important properties when they are used for motors and the like; the values of these properties are desired to be as large as possible. However, it is difficult to enhance these values unless the coercive force ($_I$Hc) of the magnet is larger than a certain value. Accordingly, it becomes necessary to increase the $_I$Hc value in order to obtain a permanent magnet having larger values of (BH)max and Br.

In the case of a permanent magnet of $Sm_2$(Co, Cu, Fe, $Ti)_{17}$-system, it is known that Br value can be increased by increasing Fe content or by decreasing Cu content. However, Br or (BH)max of the magnets cannot be improved by merely increasing Fe content or by simply decreasing Cu content, since increase of Fe content or decrease of Cu content results in a lowering of $_I$Hc value. For this reason, the composition of the conventional $Sm_2$(Co, Cu, Fe, $Ti)_{17}$-system magnet has been determined with the aim of making Br value as large as possible while maintaining $_I$Hc value at a level larger than a certain value.

For instance, Japanese Patent Publication No. 15096/1980 discloses that a permanent magnet prepared by molding in a magnetic field a powdered alloy composed of 10 to about 30% by weight of Y and other rare earch element(s), 0.2~7% by weight of Ti, 5~20% by weight of Cu, 2~15% by weight of Fe, and the balance of Co principally followed by sintering the same, is excellent in oxidation resistance and also in magnetic properties such as $_I$Hc and (BH)max. Further, Japanese Laid-Open Patent Application No. 109191/1977 discloses a permanent magnet prepared by molding in a magnetic field a powdered alloy composed of 23 to about 30% by weight of Sm, 0.2 to about 1.5% by weight of Ti, 9 to about 13% by weight of Cu, 3 to about 12% by weight of Fe, and the balance of Co principally. These prior art magnets, however, can not necessarily be considered to be satisfactory ones, since the composition of these magnets has resulted from a compromising adjustment between the changes of residual magnetic flux density (Br) and coercive force ($_I$Hc) which are caused by varying Cu content and Fe content.

A permanent magnet having excellent magnetic properties, i.e., large Br value and (BH)max value, will be obtainable if it becomes possible to reduce the Br-lowering Cu component, increase the Br-enhancing Fe component and, at the same time, maintain $_I$Hc value being at a level higher than a certain value.

SUMMARY OF THE INVENTION

To accomplish the above subject, the present inventors have made intensive studies on the composition of the alloy constituting a permanent magnet and also the heat treatment process of the same. As the result, it was found that $_I$Hc value can be increased even by increasing Fe content and decreasing Cu content, if the composition of said alloy is represented by the formula Sm(Co, Cu, Fe, $Ti)_Z$, wherein $Z>6.7$, and powder of the alloy is subjected to a particular heat treatment after sintering procedure. This finding was quite contrary to the conventional teachings.

The particular heat treatment mentioned here means a step of (a) after sintering, annealing the sintered body at a cooling rate of not more than 5° C./min from an initial temperature of from 600° C. to 900° C.; or (b) after sintering, subjecting the sintered body to a multi-stepwise aging processing initiated from a higher temperature to a lower temperature within the temperature range of from 350° to about 900° C.

The $_I$Hc value of the permanent magnet obtained by subjecting the above sintered body to this particular heat treatment was found to increase remarkably, and thus this invention had been accomplished.

Accordingly, this invention aims to provide a permanent magnet of $Sm_2Co_{17}$-system which is excellent in all the magnetic properties such as Br, (BH)max and $_I$Hc, and also, in the oxidation resistance.

According to this invention, there is provided a permanent magnet comprising a powdered alloy composed of 23 to about 29% by weight of samarium, 0.2 to about 7% by weight of titanium, 3 to about 9% by weight of copper, 10 to about 25% by weight of iron, and the balance of cobalt principally; said powdered alloy being sintered to obtain a sintered body, followed by (a) annealing the sintered body at a cooling rate of not more than 5° C./min from an annealing-initiating temperature of from 600° to 700° C., or (b) subjecting the sintered body to a multi-stepwise aging processing initiated from a higher temperature to a lower temperature within the temperature range of from 350° to 900° C.

DETAILED DESCRIPTION OF PREFERRED EMBODIMENTS

The effect of this invention can be attained by a combination, as above, of (i) specific composition of the metallic elements for constituting the magnet and (ii) particular heat treatment, i.e. embodiment (a) or (b) mentioned above, after the sintering.

In the case of the embodiment (a), the content of Sm in the powdered alloy, being sintered to obtain a sintered body, followed by heat treatment, should be 25 to about 29% by weight, and more preferably, 25 to about 28% by weight; $_I$Hc value will not increase if it is less than 25% by weight, and increase of (BH)max value will not be expected since $_I$Hc value decreases and at the same time Br value also decreases if the Sm content exceeds 29% by weight. Ti content should be 0.2 to about 3% by weight, and more preferably, 0.5 to about 3% by weight; $_I$Hc value will not increase remarkably in case the Ti content is less than 0.2 by weight, and Br value will decrease if it exceeds 3% by weight. Cu content should be 3 to about 9% by weight, and more preferably, 4.5 to about 9% by weight; increase of $_I$Hc value will not be expected in case its content is less than 3% by weight, and, if it exceeds 9% by weight, Br value decreases and at the same time the heat treatment effect, to be mentioned later, becomes poorer so that (BH)max value will not increase particularly. Fe content should be 10 to about 20% by weight, and more preferably 11.5 to about 18% by weight; the heat treatment effect will be poor if the Fe content is less than 10% by weight, and, if it exceeds 20% by weight, $_I$Hc value decreases, heat treatment effect becomes poorer and therefore (BH)max value will decrease. The balance of the powdered alloy is Co.

The permanent magnet according to the above embodiment (a) of this invention is prepared in the following manner:

First a mold is packed with powdered alloy of the abovementioned ratio, which powder is then molded under compression in a magnetic field to form a molded body. The molded body is sintered in an inert atmosphere such as an atmosphere of vacuum, nitrogen or rare gas. The sintering is usually carried out at temperatures of 1050° to about 1250° C.

The sintered body thus obtained is then subjected to a prescribed heat treatment, in which the sintered body is retained initially for a prescribed time at a temperature of from 600° C. to 700° C. in an inert atmosphere as mentioned above. If the temperature is out of the above range, its $_I$Hc value and (BH)max value will decrease extremely. Enough time for retaining the sintered body at that temperature (i.e. retention time) ranges usually from 0.1 second to 3 hours.

The sintered body is thereafter annealed at a cooling ratio of not more than 5° C./min, and more preferably from a practical view point, 0.05° to about 5° C./min. Increase of $_I$Hc value will not be sufficient in case the cooling ratio is kept higher than 5° C./min.

In the case of the embodiment (b) mentioned above, the metallic powdery material should be composed of 23 to about 27% by weight, more preferably, 25 to about 27% by weight of Sm; 0.2 to about 7% by weight, more preferably, 0.5 to about 5% by weight of Ti; 3 to about 9% by weight, more preferably, 4 to about 9% by weight of Cu; 14 to about 25% by weight, more preferably 14 to about 20% by weight of Fe; and the balance of Co principally. Sm content of less than 23% by weight, and exceeding 27% by weight, will result in no increase of $_I$Hc value and also result in decrease of Br value and no increase of (BH)max value. Ti content of less than 0.2% by weight will not produce remarkable increase of $_I$Hc value and Ti content exceeding 7% by weight will result in decrease of Br value. Cu content of less than 3% by weight will result in no increase of $_I$Hc value, while Cu content exceeding 9% by weight results in a decrease of Br value, low hardening-by-aging property and little increase of (BH)max value. Fe content of less than 14% by weight will result in little increase of Br and (BH)max values, and Fe content exceeding 25% by weight will result in extreme decrease of $_I$Hc value, very low hardening-by-aging property, and decrease of (BH)max value.

Also in the above embodiment (b) of the invention, the sintering processing and aging processing are similarly to the aforesaid embodiment (a), required to be carried out in an inert atmosphere such as an atmosphere of vacuum, nitrogen or rare gas. Sintering is carried out at temperatures of 1050° to about 1250° C.

Aging processing is required to be carried out by a multi-stepwise processing of not less than two stages starting from a higher temperature to a lower temperature within the temperature range of 350° to about 900° C. Preferably patterns of such aging processings may be exemplified as follows:

In the case of Cu≧7.5% by weight, the aging processing should preferably comprise at least three stages of a first stage aging carried out within the temperature range of 800° to about 900° C., and subsequently, a second stage aging within the temperature range of 600° to about 800° C. and a third stage aging within the temperature range of 400° to about 700° C. In the case of Cu<7.5% by weight, the aging processing should preferably comprise at least a first stage aging carried out within the temperature range of 800° to about 900° C., and subsequently, a second stage aging in 650° to about 800° C., a third stage aging in 450°~700° C. and a fourth stage aging in 350° to about 600° C.

BRIEF DESCRIPTION OF THE DRAWING

This invention will be described in more detail below by Examples, with reference to the accompanying drawings.

In the following Examples, the permanent magnets according to this invention were prepared in the following manner:

Every metallic element was mixed in the prescribed ratio, and 4 kg of the mixed materials were fused in a vacuum high-frequency inductive heating furnace, followed by cooling, to obtain a uniform ingot. The ingot thus obtained was crushed roughly and further ground with a jet mill to a fine powder, i.e., a powdered alloy. The fine powder was packed into a mold and was compression-molded under a pressure of 2 ton/cm$^2$ while applying thereto a magnetic field of 20,000 oersted. The molded body thus obtained was subjected to a sintering processing for a prescribed time at a prescribed temperature in an atmosphere of argon gas, and immediately thereafter, was cooled temporarily to a room temperature, and then heated again to a prescribed temperature at which a prescribed annealing processing or multi-stepwise aging processing.

In the following Examples, "percent(%)" indicates "percent by weight".

EXAMPLE 1

Dependence of $_I$Hc value and (BH)max value on Cu content, and effect of heat treatment:

Permanent magnets prepared:

Composition: Sm, 27.7%; Ti, 0.7%; Fe, 11.8%; Cu, 2 to about 11.5%; the balance, Co.

Sintering conditions: 1195° C. for 1 hour

Heat treatment: After retention for 1 hour at 650° C., annealed at cooling rate of 2° C./min.

For comparison, prepared was another permanent magnet (Comparative Example 1) in the same manner as in Example 1 except that no heat treatment was performed.

Figure 1:
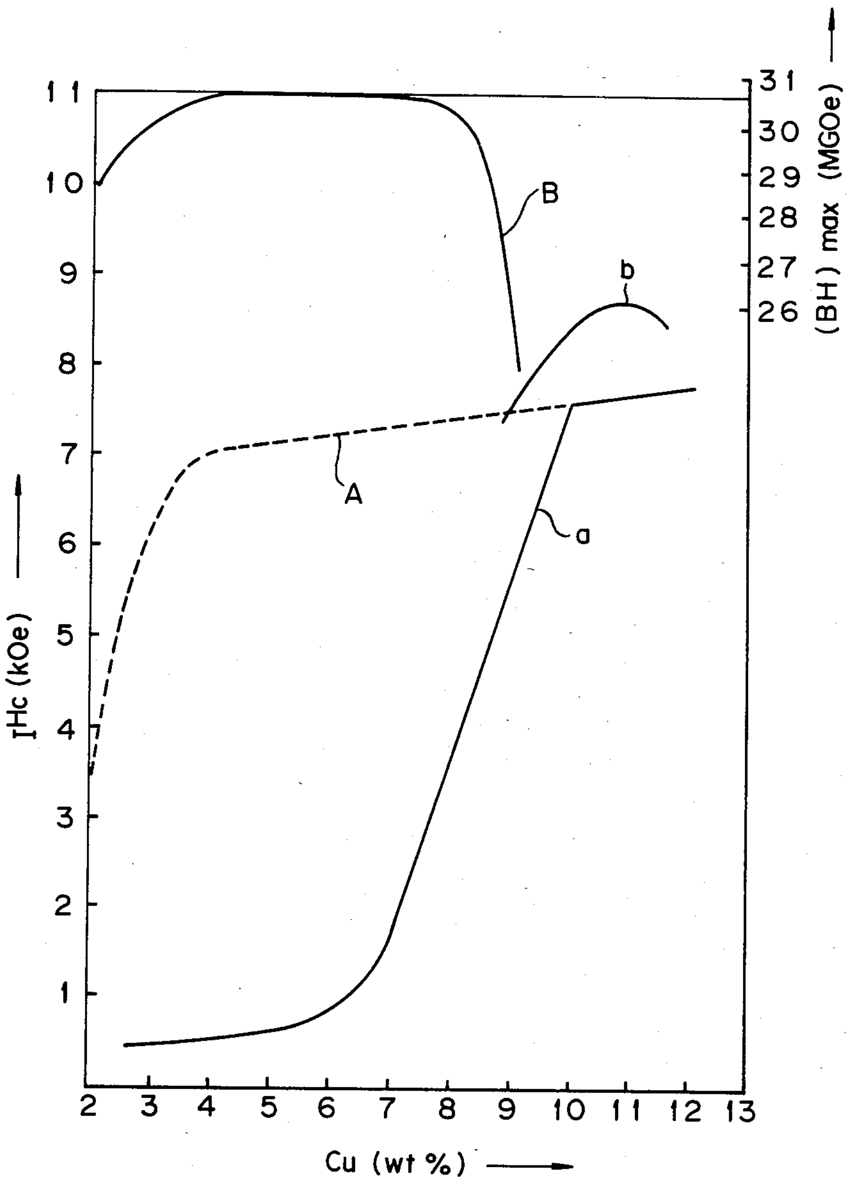
FIG. 1 illustrates dependence of $_I$Hc value and (BH)max value on the content of Cu and effect of heat treatment, with respect to a permanent magnet prepared in Example 1.

Relationship between Cu content of the permanent magnets prepared and values of $_{I}$Hc and (BH)max is shown in FIG. 1, in which Curve A represents $_{I}$Hc of the magnet of Example 1; Curve a, $_{I}$Hc of that of Comparative Example 1; Curve B, (BH)max of that of Example 1; and Curve b, (BH)max of that of Comparative Example 1.

As apparent from FIG. 1, the permanent magnet according to this invention shows great $_{I}$Hc even when the Cu content is more than 9%. The peak of (BH)max which had been centered at 10 to about 11% of Cu content before the heat treatment, shifted to the position where the Cu content is not more than 7 to about 8%, simultaneously with the result of considerable increase of (BH)max value.

EXAMPLE 2

Prepared were permanent magnets of Sample Nos. 1 to about 4 as Examples of this invention. Also prepared were those of Sample Nos. 11 to 21 as Comparative Examples. Composition of each of Samples and conditions of sintering are as shown in Table 1. Conditions of heat treatment, corresponding to the respective patterns of heat treatment which are numbered in the Table, are as follows:

Pattern 1: Annealed at 2° C./min from 650° C. for 1 hr.
Pattern 2: Annealed at 10° C./min from 600° C. for 1 hr.
Pattern 3: Annealed at 2° C./min from 950° C. for 1 hr.
Pattern 4: Annealed at 2° C./min from 550° C. for 1 hr.

Comparative Examples in Table 1 are all outside of this invention with respect to either composition of the materials or conditions of the heat treatment. Values of Br, $_{I}$Hc and (BH)max are also shown together in Table 1.

TABLE 1

| | Sample No. | Composition Sm | Ti | Cu | Fe | Co | Conditions of sintering °C. × hr | Patterns of heat treatment | Br(G) | $_{I}$Hc (Oe) | (BH)max (MGOe) |
|---|---|---|---|---|---|---|---|---|---|---|---|
| Examples of the invention | 1 | 27.7 | 0.70 | 7.9 | 11.8 | Balance | 1195 × 1 | 1 | 10900 | 7300 | 29.7 |
| | 2 | 27.1 | 0.66 | 8.0 | 13.2 | " | 1195 × 1 | 1 | 11200 | 6700 | 30.4 |
| | 3 | 26.8 | 1.00 | 6.0 | 12.8 | " | 1195 × 1 | 1 | 11100 | 6500 | 30.0 |
| | 4 | 27.2 | 1.12 | 7.9 | 15.0 | " | 1165 × 1 | 1 | 11400 | 7400 | 30.5 |
| Comparative Examples | 11 | 27.7 | 0.70 | 7.9 | 11.8 | " | 1195 × 1 | 2 | 10900 | 5000 | 23.0 |
| | 12 | 27.7 | 0.70 | 7.9 | 11.8 | " | 1195 × 1 | 3 | 10900 | 4500 | 21.0 |
| | 13 | 27.7 | 0.70 | 7.9 | 11.8 | " | 1195 × 1 | 4 | 10900 | 4700 | 21.2 |
| | 14 | 27.9 | 0.60 | 5.5 | 6.0 | " | 1195 × 1 | 1 | 8100 | 3500 | 9.0 |
| | 15 | 26.3 | 2.50 | 4.0 | 19.0 | " | 1180 × 1 | 1 | 12000 | 1400 | 10.0 |
| | 16 | 26.2 | 2.00 | 1.8 | 13.9 | " | 1190 × 1 | 1 | 12000 | 1500 | 10.5 |
| | 17 | 27.0 | 0.83 | 11.0 | 13.6 | " | 1145 × 1 | 1 | 9400 | 4000 | 18.5 |
| | 18 | 26.3 | — | 8.1 | 13.7 | " | 1180 × 1 | 1 | 11800 | 3000 | 18.2 |
| | 19 | 26.5 | 4.00 | 8.1 | 13.0 | " | 1175 × 1 | 1 | 8200 | 7000 | 17.0 |
| | 20 | 20.2 | 1.80 | 6.7 | 13.9 | " | 1180 × 1 | 1 | 11000 | 2000 | 10.0 |
| | 21 | 31.5 | 1.80 | 6.7 | 13.9 | " | 1180 × 1 | 1 | 9000 | 3000 | 13.5 |

EXAMPLE 3

Dependence of (BH)max value on cooling rate:

Permanent magnets prepared:

Compositions: Sm, 27.7%; Ti, 0.70%; Cu, 7.9%; Fe, 11.8%; the balance, Co.
Sintering conditions: 1195° C. for 1 hour.
Heat treatment: After retention for 30 minutes at 650° C., annealed at varied cooling rate.

Figure 2:
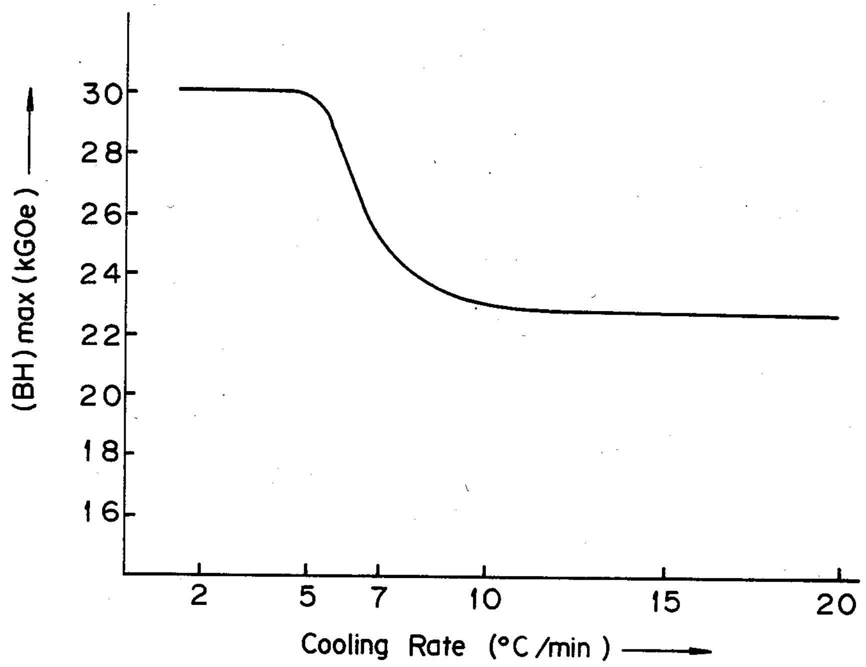
FIG. 2 illustrates the relationship between (BH)max and cooling rate as to a permanent magnet having composition shown in Example 3.

Relationship between (BH)max and cooling rate of the permanent magnets thus prepared is shown in FIG. 2. As apparent therefrom, (BH)max value increases when the cooling ratio is not higher than 5° C./min.

EXAMPLE 4

Dependence of $_{I}$Hc value and (BH)max value on Cu content, and effect of multi-stepwise aging processing:

Permanent magnets prepared:

Composition: Sm, 26.5%; Ti, 1.20%; Cu, 6~11.5%; Fe, 16.0%; the balance, Co.
Sintering conditions: 1180° C. for 1 hour.
Aging processing: (850° C. for 30 minutes)+(750° C. for 1 hour)+(650° C. for 2 hours)+(550° C. for 4 hours).

Figure 3:
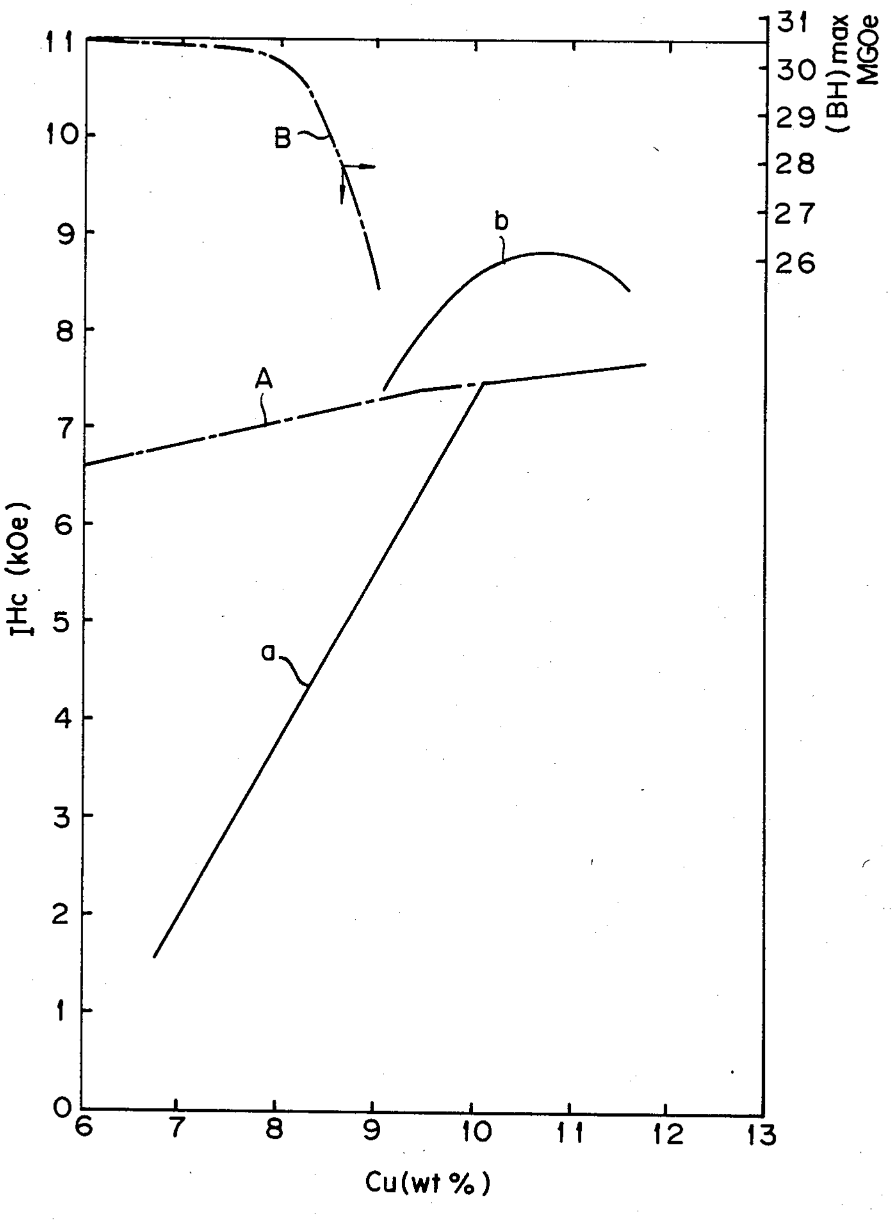
FIG. 3 illustrates dependence of $_I$Hc value and (BH)max value on the content of Cu and effect of heat treatment, in respect of a permanent magnet prepared in Example 4.

For comparison, prepared was another permanent magnet (Comparative Example 2) in the same manner as Example 4 except that no aging processing was performed. Relationship between Cu content and values of $_{I}$Hc and (BH)max of the permanent magnets thus prepared is shown in FIG. 3, in which Curve A represents $_{I}$Hc of the magnet of Example 4; Curve a, $_{I}$Hc of that of Comparative Example 2; Curve B, (BH)max of that of Example 4; and Curve b, (BH)max of that of Comparative Example 2.

As apparent from FIG. 3, the permanent magnet according to Example 4 of this invention shows great $_{I}$Hc even when the Cu content is not more than 9%. The peak of (BH)max which had been centered at 10 to about 11% of Cu content before the multi-stepwise aging processing, shifted to the position where the Cu content is not more than 7 to about 8%, and also the value of (BH)max became larger considerably.

EXAMPLE 5

Dependence of $_{I}$Hc value on Fe content:

Permanent magnets prepared:

Composition: Sm, 25.8%; Ti, 1.50%; Cu, 6.70%; Fe, 11 to about 19%; the balance, Co.
Sintering conditions: 1175° C. for 1 hour.
Aging processing: (850° C. for 30 minutes)+(750° C. for 1 hour)+(650° C. for 2 hours)+(550° C. for 4 hours).

Figure 4:
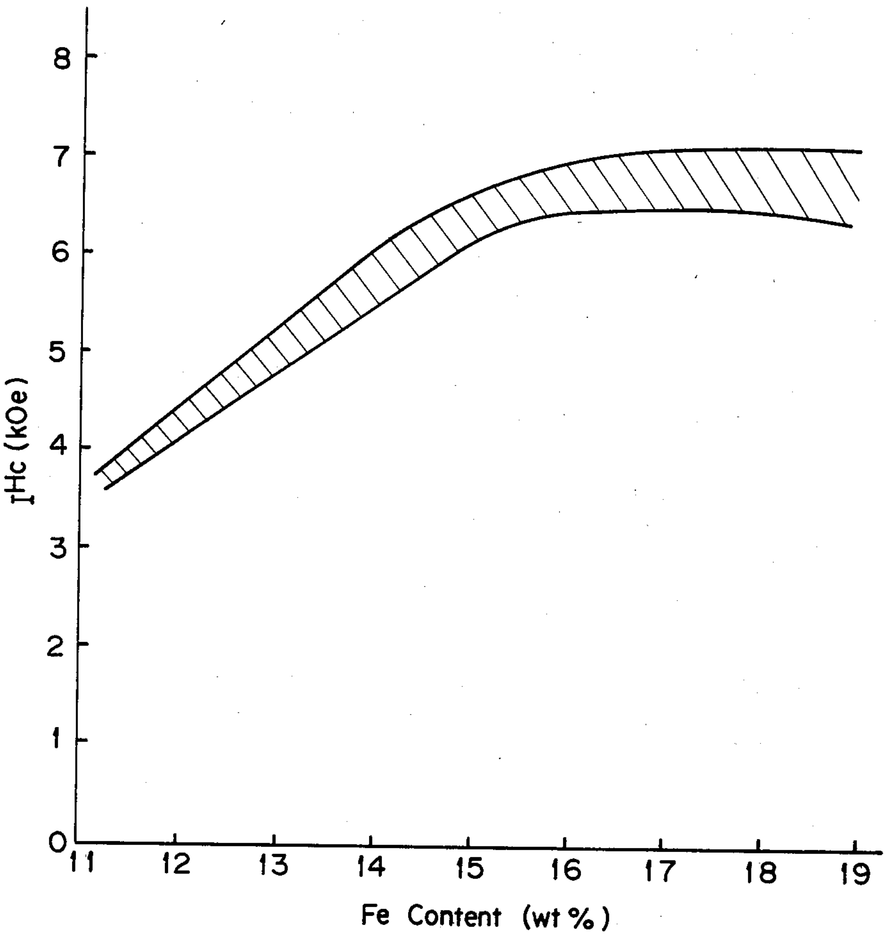
FIG. 4 illustrates dependence of $_I$Hc value on Fe content as to a permanent magnet prepared in Example 5.
Figure 5:
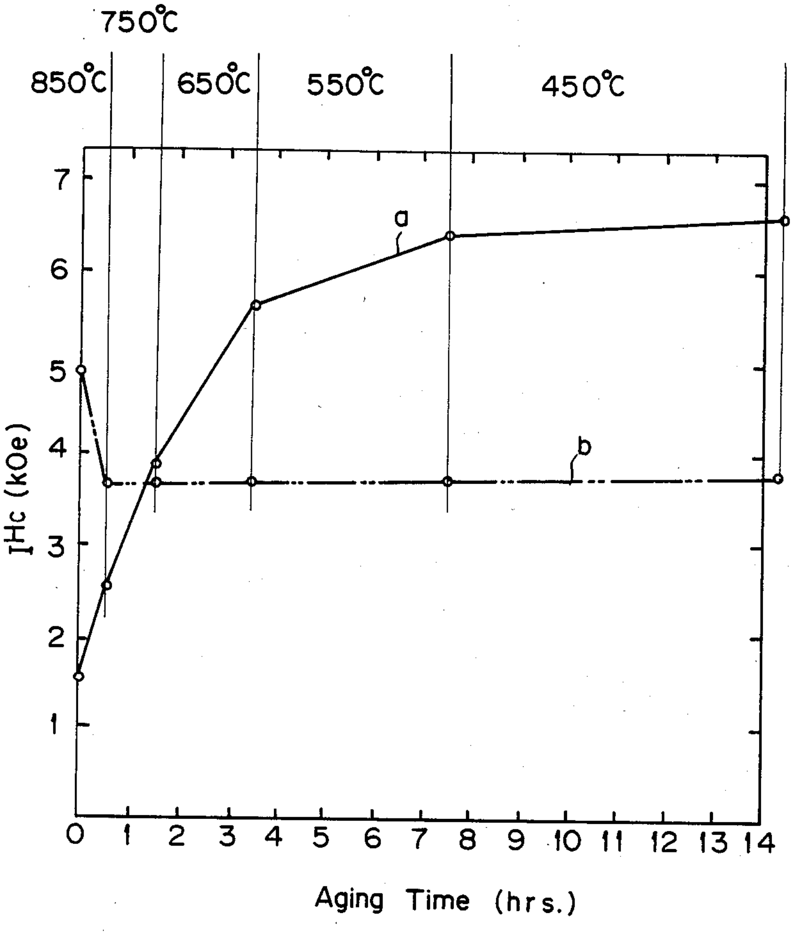
FIG. 5 illustrates the variation of $_I$Hc value caused by the aging processings according to Example 6 and Comparative Examples.

Relationship between Fe content and $_{I}$Hc value of the permanent magnets thus prepared is shown in FIG. 4. As apparent from FIG. 4, the more the Fe content is, the larger the $_{I}$Hc value becomes; more specifically, $_{I}$Hc value is saturated at the position where the Fe content is more than 14% which is within the scope of this invention. As evident herefrom, it is a result quite different from the conventional teachings, and is one of the characteristic features of this invention, that the $_IHc$ value increases with increase of Fe content.

EXAMPLE 6

Prepared were permanent magnets of Sample Nos. 31 to about 44 as Examples of this invention. Also prepared were permant magnets of Sample Nos. 51 to about 64 as Comparative Examples. Composition of each of Samples and conditions of sintering are as shown in Table 2. Conditions of aging processing, corresponding to the respective patterns of aging processing which are numbered in the Table, are as follows:

(Patterns of aging processing)

Pattern 1: (850° C. for 30 min)+(750° C. for 1 hr)+(650° C. for 2 hrs)+(550° C. for 4 hrs)+(450° C. for 8 hrs).
Pattern 2: (850° C. for 30 min)+(650° C. for 4 hrs).
Pattern 3: (750° C. for 2 hrs)+(550° C. for 8 hrs).
Pattern 4: (850° C. for 10 min)+(650° C. for 2 hrs)+(550° C. for 4 hrs).
Pattern 5: 750° C. for 3 hrs.
Pattern 6: (950° C. for 30 min)+(Pattern 1).
Pattern 7: 350° C. for 100 hrs.

Comparative Examples in Table 2 are all outside of this invention with respect to either composition of the materials or conditions of the aging processing. Values of Br, $_IHc$ and (BH)max are shown together in Table 2.

of $Sm_2CO_{17}$-system, which is of construction consisting of phase of $R_2CO_{17}$ and phase of $RCO_5$ and having a cell structure of two phase-separated type, has been improved in its constructional features and its magnetic properties of both phases.

The oxidation resistance of the permanent magnet according to this invention is also improved because of incorporation of Ti.

We claim:

1. A permanent magnet produced by a process comprising the steps of:
(a) sintering a powdered alloy comprising from about 25 to about 29% by weight of samarium from about 0.2 to about 3% by weight of titanium, from about 3 to about 9% by weight of copper, from about 10 to 20% by weight of iron and the balance consisting essentially of cobalt to obtain a sintered body; and
(b) annealing the sintered body at a cooling rate of not more than about 5° C./min from an annealing initiating temperature of from about 600° to 700° C.

2. A permanent magnet according to claim 1, wherein said powdered alloy comprises from 6 to about 28 by weight of samarium, from about 0.5 to about 3% by weight of titanium, from about 4.5 to about 9% by weight of copper, from about 11.5 to about 18% by weight of iron, and the balance consists essentially of cobalt.

3. A permanent magnet according to claim 1, wherein said cooling rate is in the range of from about 0.05° to about 5° C./min.

TABLE 2

| | Sample No. | Sm | Ti | Cu | Fe | Co | Br(G) | $_IH_c$ (Oe) | (BH)max (MGOe) | Conditions of sintering °C. × hr | Aging pattern |
|---|---|---|---|---|---|---|---|---|---|---|---|
| Examples of the invention | 31 | 26.5 | 1.80 | 6.7 | 15.0 | Balance | 11,100 | 6,500 | 30.0 | 1175 × 1 | 1 |
| | 32 | 25.3 | 2.00 | 4.5 | 19.0 | " | 11,400 | 7,000 | 32.0 | 1180 × 1 | 1 |
| | 33 | 26.0 | 1.20 | 8.1 | 15.8 | " | 10,800 | 6,500 | 28.0 | 1190 × 1 | 1 |
| | 34 | 26.2 | 1.50 | 5.3 | 16.0 | " | 11,000 | 6,700 | 30.5 | 1175 × 1 | 1 |
| | 35 | 25.5 | 2.20 | 3.8 | 16.1 | " | 11,050 | 6,200 | 28.0 | 1200 × 1 | 1 |
| | 36 | 24.5 | 2.30 | 4.0 | 22.0 | " | 11,700 | 6,200 | 31.0 | 1180 × 1 | 1 |
| | 37 | 25.3 | 2.00 | 4.5 | 19.0 | " | 11,400 | 6,500 | 31.0 | 1180 × 1 | 3 |
| | 38 | 26.0 | 1.20 | 8.1 | 15.8 | " | 10,800 | 6,300 | 27.0 | 1190 × 1 | 2 |
| | 39 | 26.5 | 1.80 | 6.7 | 15.0 | " | 11,100 | 6,200 | 29.0 | 1175 × 1 | 2 |
| | 40 | 25.5 | 2.20 | 3.8 | 16.1 | " | 11,040 | 6,000 | 28.0 | 1200 × 1 | 3 |
| | 41 | 24.5 | 2.30 | 4.0 | 22.0 | " | 11,700 | 6,000 | 31.0 | 1180 × 1 | 3 |
| | 42 | 26.0 | 1.20 | 8.1 | 15.8 | " | 10,800 | 6,200 | 27.0 | 1190 × 1 | 3 |
| | 43 | 26.9 | 1.20 | 8.1 | 15.2 | " | 10,700 | 7,500 | 28.5 | 1170 × 1 | 4 |
| | 44 | 26.2 | 1.50 | 8.0 | 16.0 | " | 11,000 | 7,200 | 31.5 | 1175 × 1 | 4 |
| Comparative Examples | 51 | 27.9 | 0.60 | 5.5 | 6.0 | " | 8,100 | 3,500 | 9.0 | 1195 × 1 | 1 |
| | 52 | 23.1 | 2.50 | 4.0 | 27.0 | " | 11,900 | 2,000 | 11.0 | 1180 × 1 | 1 |
| | 53 | 28.0 | 0.65 | 7.2 | 2.1 | " | 8,000 | 4,300 | 12.0 | 1190 × 1 | 1 |
| | 54 | 25.0 | 2.00 | 1.8 | 13.9 | " | 12,000 | 1,500 | 10.0 | 1190 × 1 | 1 |
| | 55 | 27.0 | 0.83 | 11.0 | 15.8 | " | 9,600 | 4,000 | 19.5 | 1145 × 1 | 1 |
| | 56 | 25.9 | — | 8.1 | 15.0 | " | 12,000 | 3,000 | 18.7 | 1180 × 1 | 1 |
| | 57 | 26.3 | 8.00 | 8.1 | 15.0 | " | 8,800 | 7,000 | 19.0 | 1175 × 1 | 1 |
| | 58 | 20.2 | 1.80 | 6.7 | 15.0 | " | 11,200 | 2,000 | 10.5 | 1180 × 1 | 1 |
| | 59 | 31.5 | 1.80 | 6.7 | 15.0 | " | 9,200 | 3,000 | 14.0 | 1180 × 1 | 1 |
| | 60 | 25.3 | 2.00 | 4.5 | 19.0 | " | 11,300 | 3,000 | 14.0 | 1180 × 1 | 6 |
| | 61 | 26.3 | 1.50 | 5.3 | 16.0 | " | 11,000 | 3,300 | 16.2 | 1175 × 1 | 6 |
| | 62 | 26.5 | 1.80 | 6.7 | 15.0 | " | 11,100 | 1,500 | 9.4 | 1175 × 1 | 7 |
| | 63 | 26.5 | 1.80 | 6.7 | 15.0 | " | 11,090 | 2,500 | 10.7 | 1175 × 1 | 5 |
| | 64 | 25.3 | 2.00 | 4.5 | 19.0 | " | 11,250 | 1,000 | 8.0 | 1180 × 1 | 7 |

As described above, the magnetic properties of the permanent magnet according to this invention are improved remarkably. It is considered that this effect results from the mechanism that the permanent magnet 4. A permanent magnet according to claim 1, wherein said sintering is carried out at a temperature of 1050° to about 1250° C. under an inert atmosphere.

* * * * *